United States Patent
Sakamoto

(10) Patent No.: US 7,595,900 B2
(45) Date of Patent: Sep. 29, 2009

(54) INFORMATION PROCESSING METHOD AND INFORMATION PROCESSING APPARATUS

(75) Inventor: Yoichi Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 11/131,196

(22) Filed: May 18, 2005

(65) Prior Publication Data

US 2005/0270552 A1    Dec. 8, 2005

(30) Foreign Application Priority Data

May 19, 2004    (JP)    ............... 2004-149390

(51) Int. Cl.
G06F 15/00    (2006.01)
G03G 15/02    (2006.01)

(52) U.S. Cl. .................... 358/1.13; 399/50

(58) Field of Classification Search ............ 358/1.13, 358/1.1, 1.15, 403, 498, 1.14, 1.16, 1.18, 358/504, 474; 709/203, 223; 399/45, 50, 399/67, 16, 221, 301, 401, 333, 79; 400/61, 400/76; 715/234, 255; 382/162, 164, 188
See application file for complete search history.

(56) References Cited

U.S. PATENT DOCUMENTS 5,872,900 A    2/1999    Tsuchitoi ............. 395/111
6,618,566 B2 *    9/2003    Kujirai et al. ........... 399/79

FOREIGN PATENT DOCUMENTS

| JP | 6-024100 | 2/1994 |
| JP | 9-190302 | 7/1997 |
| KR | 2000-32743 | 6/2000 |

OTHER PUBLICATIONS

Office Action, dated Aug. 18, 2008, in JP 2004-149390.
"Algorithm Analysis on Linked List Sort Programming", Microcomputer Application, vol. 18, No. 12, 2002, pp. 60-62, 64, submitted with English translation.

* cited by examiner

Primary Examiner—Saeid Ebrahimi Dehkordy
(74) Attorney, Agent, or Firm—Fitzpatrick, Cella, Harper & Scinto

(57) ABSTRACT

Data associated with printing on the sides of sheets subjected to printing by a printing apparatus are managed in the print order. The data associated with printing on the sides are output to the printing apparatus in the print order.

6 Claims, 17 Drawing Sheets

FIG. 14

| TRANSMISSION ORDER | INPUT IMAGE |
|---|---|
| 1 | SHEET 1  BACK SIDE |
| 2 | (UNAVAILABLE) |
| 3 | SHEET 2  BACK SIDE |
| 4 | SHEET 1  FRONT SIDE |
| 5 | SHEET 3  BACK SIDE |
| 6 | SHEET 2  FRONT SIDE |
| 7 | (BLANK) |
| 8 | SHEET 3  FRONT SIDE |

INFORMATION PROCESSING METHOD AND INFORMATION PROCESSING APPARATUS

FIELD OF THE INVENTION

The present invention relates to a technique of outputting data associated with printing to a printing apparatus.

BACKGROUND OF THE INVENTION

A printer generally holds a page memory for the purpose of recovery from an error such as a jam, and when an error occurs, error recovery is done using print data stored in the page memory.

However, error recovery cannot be achieved unless the printer holds a memory of a capacity capable of holding print data of at least two pages in order to perform double-sided printing by this method. Printing at the highest print speed of a printer engine generally requires a memory of a capacity capable of holding print data of four or eight pages. A high-resolution printer or color printer with a large data size needs a large-capacity memory in order to hold print data, raising the printer cost.

To solve this problem, there has conventionally been known a technique of suppressing the memory of a printer to a small capacity by equipping a page memory for error recovery with a host apparatus.

In double-sided printing by a printer which performs face-down delivery, like a general page printer, printing is first done on the back side (even-numbered page) and then the front side (odd-numbered page) so as to arrange a bundle of delivered paper sheets in the page order. Pages are printed in an order of 2, 1, 4, 3, . . . in double-sided printing of so-called 1-sheet retention, and an order of 2, 4, 1, 6, 3, . . . in double-sided printing of so-called 2-sheet retention by alternate paper feed.

This method, however, does not change the page transmission order in accordance with the print order, and requires an extra memory for double-sided printing on the printer side. For example, in double-sided printing of 1-sheet retention, pages are transmitted in an order of 1, 2, 3, 4, . . . , and after data of the first page is stored in the printer, data of the second page is received to start printing from the second page. The printer requires at least a memory capacity capable of holding print data of at least two pages.

SUMMARY OF THE INVENTION

The present invention has been made to overcome the conventional drawbacks, and has as its object to provide a technique of making the order of transmitting pages to a printing apparatus coincide with the print order of the printing apparatus while suppressing the memory amount used.

In order to achieve an object of the present invention, for example, an information processing method of the present invention comprises the following arrangement.

That is, an information processing method performed by an information processing apparatus which generates data associated with printing and outputs the data to a printing apparatus configured to perform double-sided printing, characterized by comprising:

a management step of managing, in a print order, data associated with printing on sides of sheets subjected to printing by the printing apparatus; and an output step of outputting the data associated with printing on the sides to the printing apparatus in the print order, wherein in the management step, the print order is managed in accordance with whether a front side and a back side can be combined to perform double-sided printing.

In order to achieve an object of the present invention, for example, an information processing apparatus of the present invention comprises the following arrangement.

That is, an information processing apparatus which generates data associated with printing and outputs the data to a printing apparatus configured to perform double-sided printing, characterized by comprising:

management means for managing, in a print order, data associated with printing on sides of sheets subjected to printing by the printing apparatus; and output means for outputting the data associated with printing on the sides to the printing apparatus in the print order, wherein the management means manages the print order in accordance with whether a front side and a back side can be combined to perform double-sided printing.

In order to achieve an object of the present invention, for example, a computer of the present invention comprises the following arrangement.

That is, a computer which generates transmission data to be output to a printing apparatus configured to perform double-sided printing, characterized by comprising means for, when a transmission data management table does not contain any blank table, adding a back side page to an end, adding a blank table to the end, and adding a front side page to the end, and when the transmission data management table contains a blank table, changing the blank table to a back side page, adding a blank table to the end, and adding a front side page to the end.

In order to achieve an object of the present invention, for example, a computer of the present invention comprises the following arrangement.

That is, a computer which generates transmission data to be output to a printing apparatus configured to perform double-sided printing, characterized by comprising:

means for, when double-sided printing is impossible in 2-sheet retention, adding a back side page to an end and adding a front side page to the end; and means for, when double-sided printing is configured not to perform 2-sheet retention and a transmission data management table does not contain any blank table, adding a back side page to the end, adding a blank table to the end, and adding a front side page to the end, and when the transmission data management table contains a blank table, changing the blank table to a back side page, adding a blank table to the end, and adding a front side page to the end.

In order to achieve an object of the present invention, for example, a printing method of the present invention comprises the following arrangement.

That is, a printing method in a computer which generates transmission data to be output to a printing apparatus configured to perform double-sided printing, characterized by comprising a step of, when a transmission data management table does not contain any blank table, adding a back side page to an end, adding a blank table to the end, and adding a front side page to the end, and when the transmission data management table contains a blank table, changing the blank table to a back side page, adding a blank table to the end, and adding a front side page to the end.

In order to achieve an object of the present invention, for example, a printing method of the present invention comprises the following arrangement.

That is, a printing method in a computer which generates transmission data to be output to a printing apparatus configured to perform double-sided printing, characterized by comprising steps of:

when double-sided printing is configured not to perform 2-sheet retention, adding a back side page to an end and adding a front side page to the end; and when double-sided printing is configured to perform 2-sheet retention and a transmission data management table does not contain any blank table, adding a back side page to the end, adding a blank table to the end, and adding a front side page to the end, and when the transmission data management table contains a blank table, changing the blank table to a back side page, adding a blank table to the end, and adding a front side page to the end.

In order to achieve an object of the present invention, for example, a program of the present invention comprises the following arrangement.

That is, a program executed by a computer which generates transmission data to be output to a printing apparatus configured to perform double-sided printing, characterized by comprising a step of, when a transmission data management table does not contain any blank table, adding a back side page to an end, adding a blank table to the end, and adding a front side page to the end, and when the transmission data management table contains a blank table, changing the blank table to a back side page, adding a blank table to the end, and adding a front side page to the end.

In order to achieve an object of the present invention, for example, a program of the present invention comprises the following arrangement.

That is, a program executed by a computer which generates transmission data to be output to a printing apparatus configured to perform double-sided printing, characterized by comprising steps of:

when double-sided printing is configured not to perform 2-sheet retention, adding a back side page to an end and adding a front side page to the end; and when double-sided printing is configured to perform 2-sheet retention and a transmission data management table does not contain any blank table, adding a back side page to the end, adding a blank table to the end, and adding a front side page to the end, and when the transmission data management table contains a blank table, changing the blank table to a back side page, adding a blank table to the end, and adding a front side page to the end.

In order to achieve an object of the present invention, for example, an information processing method of the present invention comprises the following arrangement.

That is, an information processing method performed by an information processing apparatus which generates data associated with printing and outputs the data to a printing apparatus configured to perform double-sided printing, characterized by comprising:

a determination step of determining a print order of data associated with printing on sides of sheets subjected to printing by the printing apparatus in accordance with whether double-sided printing is configured to perform 2-sheet retention; and an output step of outputting the data associated with printing on the sides to the printing apparatus in the print order.

In order to achieve an object of the present invention, for example, an information processing apparatus of the present invention comprises the following arrangement.

That is, an information processing apparatus which generates data associated with printing and outputs the data to a printing apparatus configured to perform double-sided printing, characterized by comprising:

determination means for determining a print order of data associated with printing on sides of sheets subjected to printing by the printing apparatus in accordance with whether double-sided printing is configured to perform 2-sheet retention; and output means for outputting the data associated with printing on the sides to the printing apparatus in the print order.

In order to achieve an object of the present invention, for example, a program of the present invention comprises the following arrangement.

That is, a program executed by an information processing apparatus which generates data associated with printing and outputs the data to a printing apparatus configured to perform double-sided printing, characterized by comprising:

a determination step of determining a print order of data associated with printing on sides of sheets subjected to printing by the printing apparatus in accordance with whether double-sided printing is configured to perform 2-sheet retention; and an output step of outputting the data associated with printing on the sides to the printing apparatus in the print order.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a table showing the relationship between the print order and pages in double-sided printing of 2-sheet retention by alternate paper feed.

DETAILED DESCRIPTION OF THE PREFERRED EMBODIMENTS

Preferred embodiments of the present invention will now be described in detail in accordance with the accompanying drawings.

First Embodiment

Figure 1:
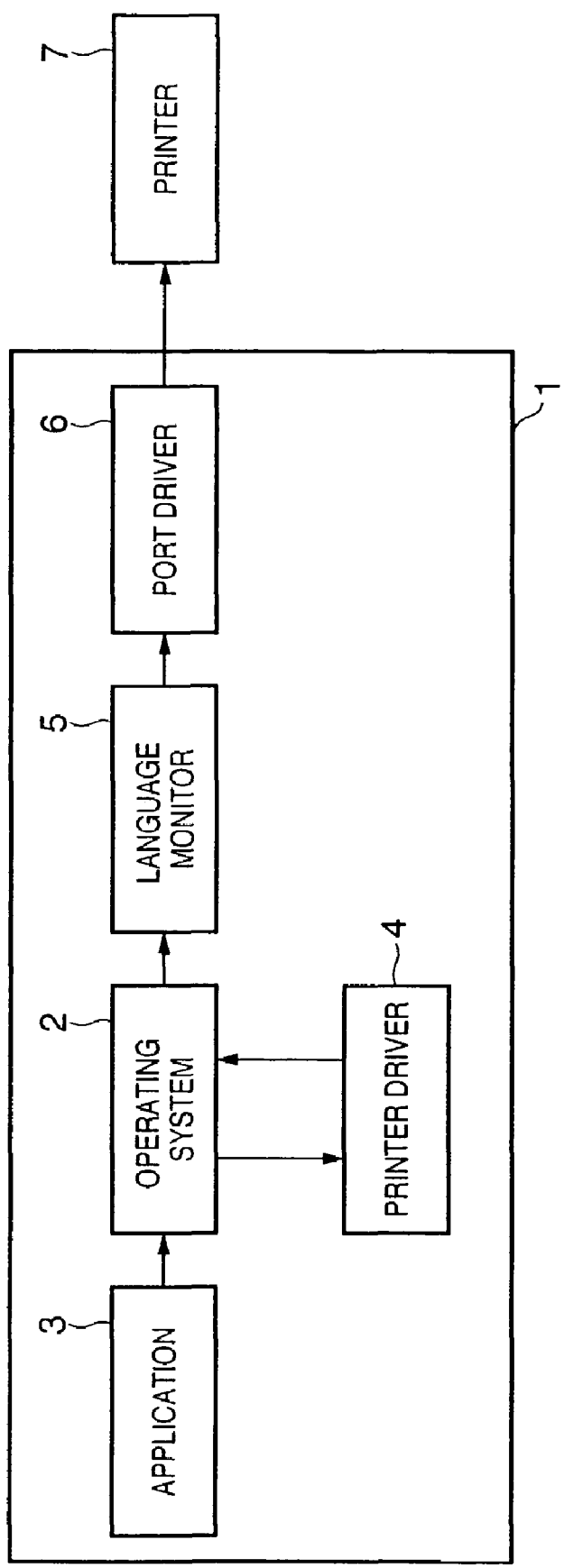
FIG. 1 is a block diagram showing the functional arrangement of a computer 1 and printer 7 according to the first embodiment of the present invention.

FIG. 1 is a block diagram showing the functional arrangement of a computer 1 and printer 7 according to the first embodiment. In FIG. 1, the computer 1 holds software such as an operating system 2, application 3, printer driver 4, language monitor 5, and port driver 6.

The operating system 2 manages hardware of the computer 1, and software such as the application 3, printer driver 4, language monitor 5, and port driver 6.

The application 3 is application software such as a word processor, and creates and prints a document in accordance with an instruction from the operator.

The printer driver 4 receives a print instruction issued by the application 3 via the operating system 2, and converts the print instruction into a printer command interpretable by the language monitor 5 and printer 7. The printer driver 4 complies with the printer 7 connected to the computer 1.

The language monitor 5 receives the printer command output from the printer driver 4, and transmits it to the printer 7 via the port driver 6. The port driver 6 transmits the printer command output from the language monitor 5 to the printer 7 via a USB interface or the like, and when receiving a status from the printer 7, outputs the status to the language monitor 5.

The printer 7 prints in accordance with the printer command received from the port driver 6.

Figure 15:
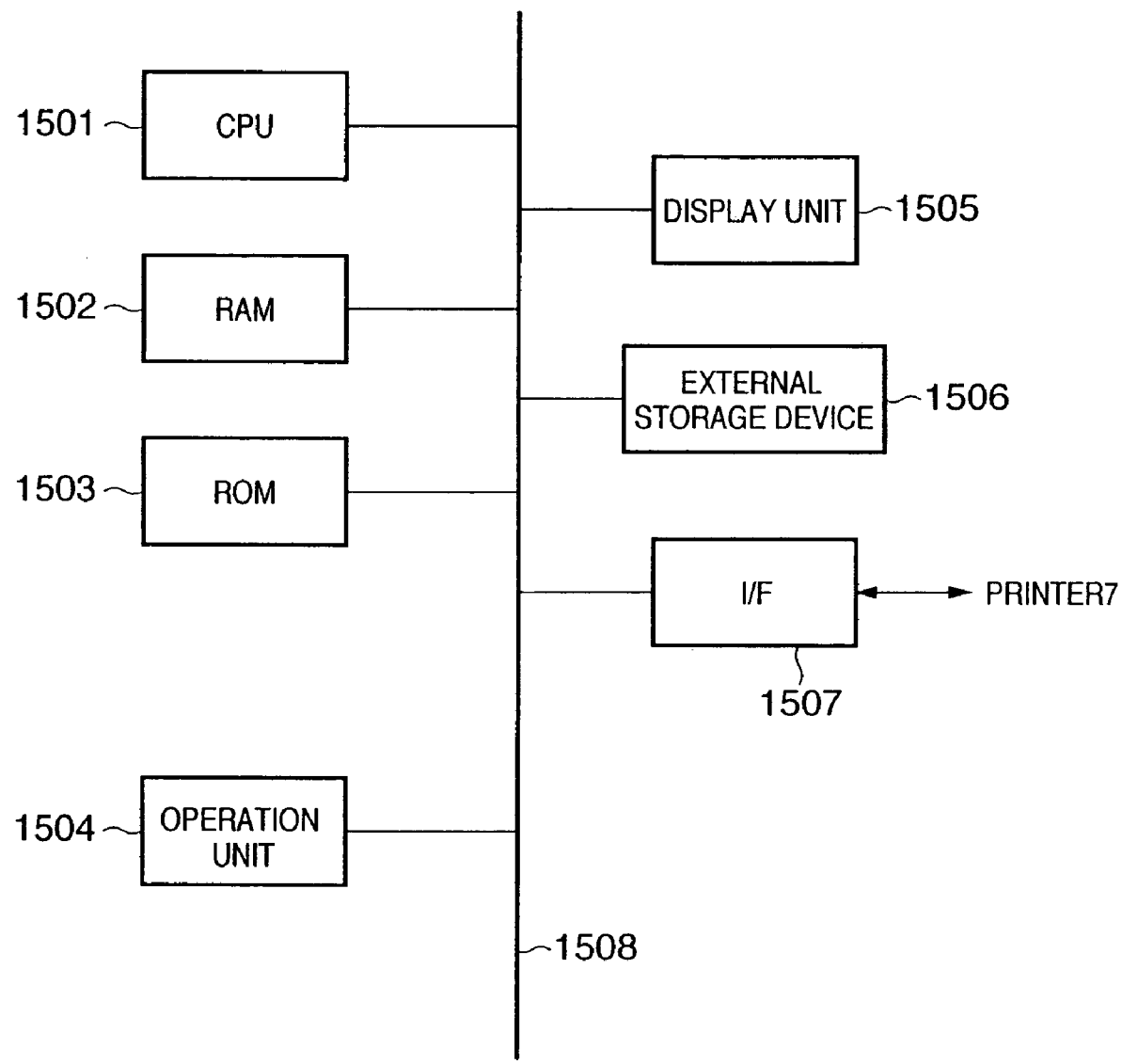
FIG. 15 is a block diagram showing the basic arrangement of the computer 1.

FIG. 15 is a block diagram showing the basic arrangement of the computer 1.

Reference numeral 1501 denotes a CPU which controls the overall computer 1 by using programs and data stored in a RAM 1502 and ROM 1503, and performs processes (e.g., process of controlling data communication with the printer 7) (to be described later).

The RAM 1502 comprises a work area which temporarily stores programs and data read out from an external storage device 1506 under the control of the CPU 1501, and is used when the CPU 1501 executes processes. The RAM 1502 also comprises various areas used to perform data communication with the printer 7.

The ROM 1503 stores a boot program, various setting data of the computer 1, and the like.

Reference numeral 1504 denotes an operation unit which is formed from input devices such as a keyboard and mouse, and can input various instructions such as a print instruction to the CPU 1501.

Reference numeral 1505 denotes a display unit which is formed from a CRT or liquid crystal screen, can display various pieces of information by images, characters, and the like, and can display a text created by a text editor or the like.

The external storage device 1506 is a large-capacity information storage device such as a hard disk drive, and saves software programs and data such as the operating system 2, application 3, printer driver 4, language monitor 5, and port driver 6. Some or all of these software programs and data are read out from the external storage device 1506 to the RAM 1502 under the control of the CPU 1501, and processed by the CPU 1501.

Reference numeral 1507 denotes an I/F (interface) which connects the computer 1 and printer 7. The computer 1 can perform data communication with the printer 7 via the I/F 1507.

Reference numeral 1508 denotes a bus which connects the above-mentioned units.

Figure 2:
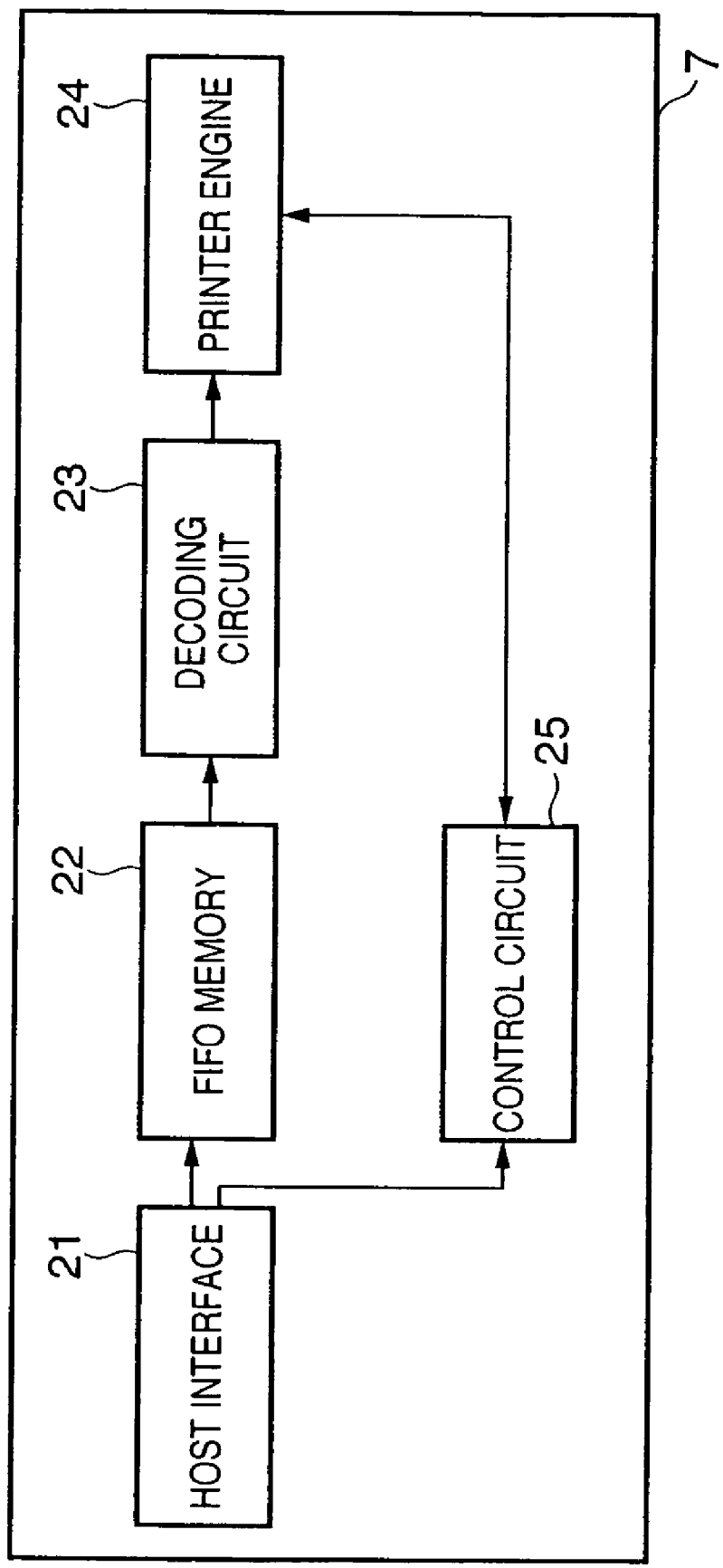
FIG. 2 is a block diagram showing the basic arrangement of the printer 7.

FIG. 2 is a block diagram showing the basic arrangement of the printer 7. In FIG. 2, reference numeral 21 denotes a host interface which is formed from a USB interface or the like, and receives a printer command from the computer 1.

Reference numeral 22 denotes an FIFO (First-In First-Out) memory which stores various data received from the host interface 21. A decoding circuit 23 decodes image data stored in the FIFO memory 22, and outputs the decoded data to a printer engine 24. The printer engine 24 is a laser beam printer engine, and prints in accordance with image data output from the decoding circuit 23 in response to an instruction from a control circuit 25. The control circuit 25 is formed from, e.g., a 1-chip CPU, and controls the network interface 21, FIFO memory 22, decoding circuit 23, and printer engine 24.

Printing operation by the computer 1 and printer 7 will be explained. In the following description, a process by the computer 1 is performed by the CPU 1501 of the computer 1. The CPU 1501 executes this process by using programs and data loaded to the RAM 1502.

When the operator operates the operation unit 1504 on the computer 1 and instructs the application 3 to print, the application 3 transfers the print instruction to the printer driver 4 via the operating system 2.

On the basis of the print instruction issued by the application 3, the printer driver 4 converts the print target into image data, compresses the image data, and outputs the compressed image data as a "printer command" together with a job information command which designates the presence/absence of double-sided printing, the print count, and the like, a page information command which designates the paper size, the paper type, the paper feed source, the delivery destination, the line length and line count of image data, and the like, a page end command which represents the end of a page, and a job end command which notifies the printer of the end of the job.

Note that double-sided printing includes long-edge binding and short-edge binding depending on whether an edge to be bound is a long or short edge. In so-called longitudinal feed of feeding a paper sheet from the short edge for long-edge binding, and so-called cross feed of feeding a paper sheet from the long edge for short-edge binding, the image of a page on the back side must be rotated by 180°, and the printer driver 4 rotates the image by 180° in advance in accordance with the binding direction and paper feed direction, as needed. In the first embodiment, the delivery destination is always a face-down tray.

When printer commands are output, the operating system 2 sequentially transfers them to the language monitor 5. The language monitor 5 sequentially transmits the received printer commands to the printer 7. Before the language monitor 5 transmits an image data command in the printer command to the printer 7, the language monitor 5 transmits a status request command, acquires the status of the printer 7, and confirms that the image data command can be transmitted.

Upon reception of the image data command, the control circuit 25 of the printer 7 stores the image data in the FIFO memory 22. Also, upon reception of a page end command, the control circuit 25 instructs the printer engine 24 to start printing. Upon reception of the printing start instruction, the printer engine 24 feeds a paper sheet, and when the paper sheet reaches a predetermined position, requests output of image data. Upon reception of the image data output request, the decoding circuit 23 reads out a compressed image from the FIFO memory 22, and outputs the decoded original image data to the printer engine 24. At this time, the image data read out from the FIFO memory 22 is removed from the FIFO memory 22.

When the printer status acquired from the printer 7 represents that printing of a page normally ends, the language monitor 5 frees a corresponding page memory. When the acquired printer status represents an error, the language monitor 5 tries retransmission from a sheet including a page which has not normally been printed. In this case, a sheet corresponds to one paper sheet, and is formed from one page in single-sided printing and two pages in double-sided printing.

After printer commands of all pages of the job are transferred, the language monitor 5 waits for the completion of printing on all sheets by the job, and upon the completion of printing on all sheets by the job, ends the job.

The data structure of a sheet management table 101 used by the language monitor 5 will be explained with reference to FIGS. 3 and 4.

Figure 3:
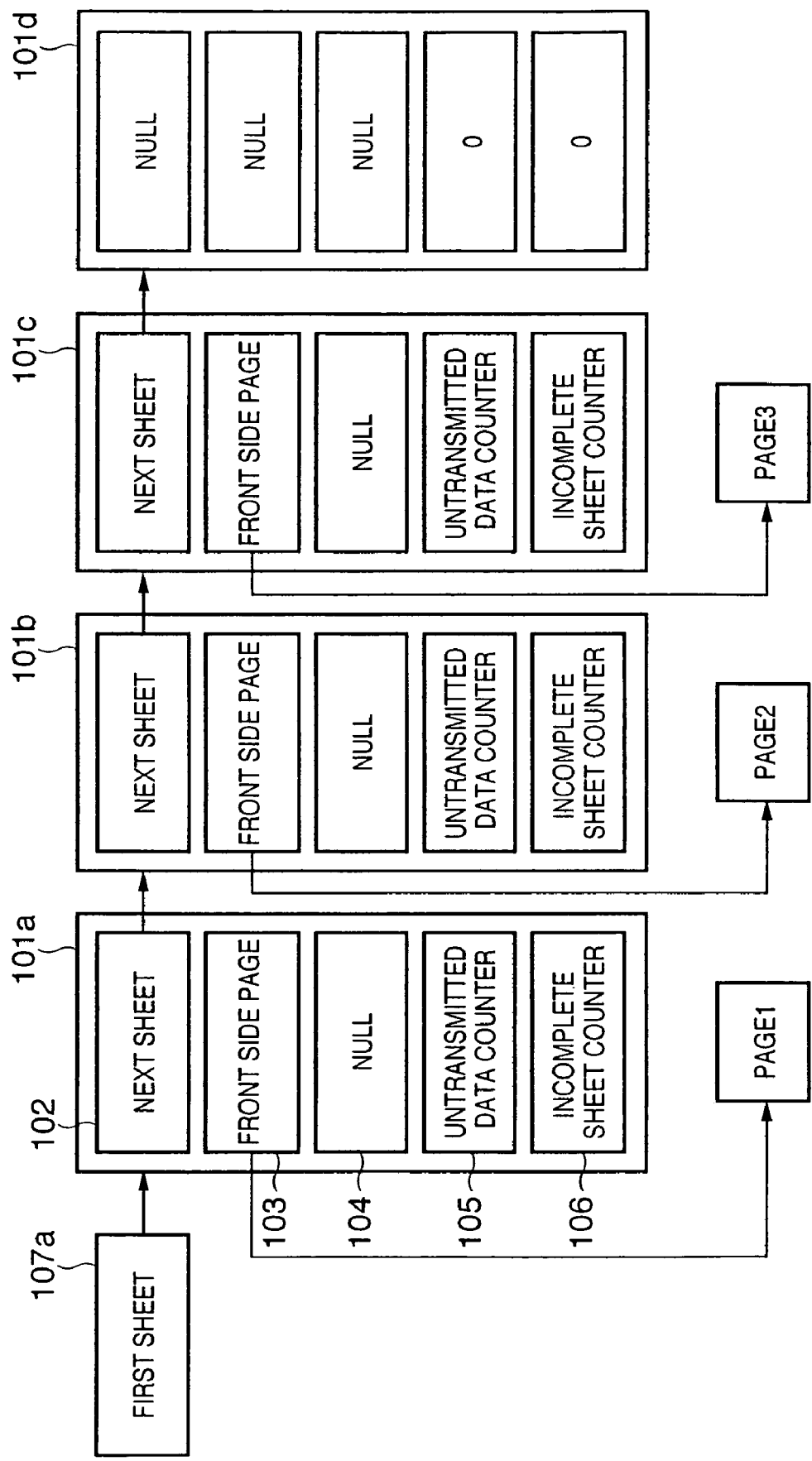
FIG. 3 is a block diagram showing an example of the structure of a sheet management table referred to by a CPU 1501 in processing a job of three pages by single-sided printing.

FIG. 3 is a block diagram showing an example of the structure of the sheet management table referred to by the CPU 1501 in processing a job of three pages by single-sided printing. FIG. 4 is a block diagram showing an example of the structure of the sheet management table referred to by the CPU 1501 in processing a job of six pages by double-sided printing.

Each sheet management table 101 (a to h are not particularly suffixed for a description common to all tables 110*a* to 101*h*) includes as building components a next sheet address 102 representing the address of the next sheet management table in the RAM 1502, a front side page address 103 representing the address of a front side page in a data buffer (buffer memory in the RAM 1502), a back side page address 104 representing the address of a back side page in the data buffer, an untransmitted data counter 105 representing the number of data which have not been transmitted, and an incomplete sheet counter 106 representing the number of sheets which have not been printed.

Figure 4:
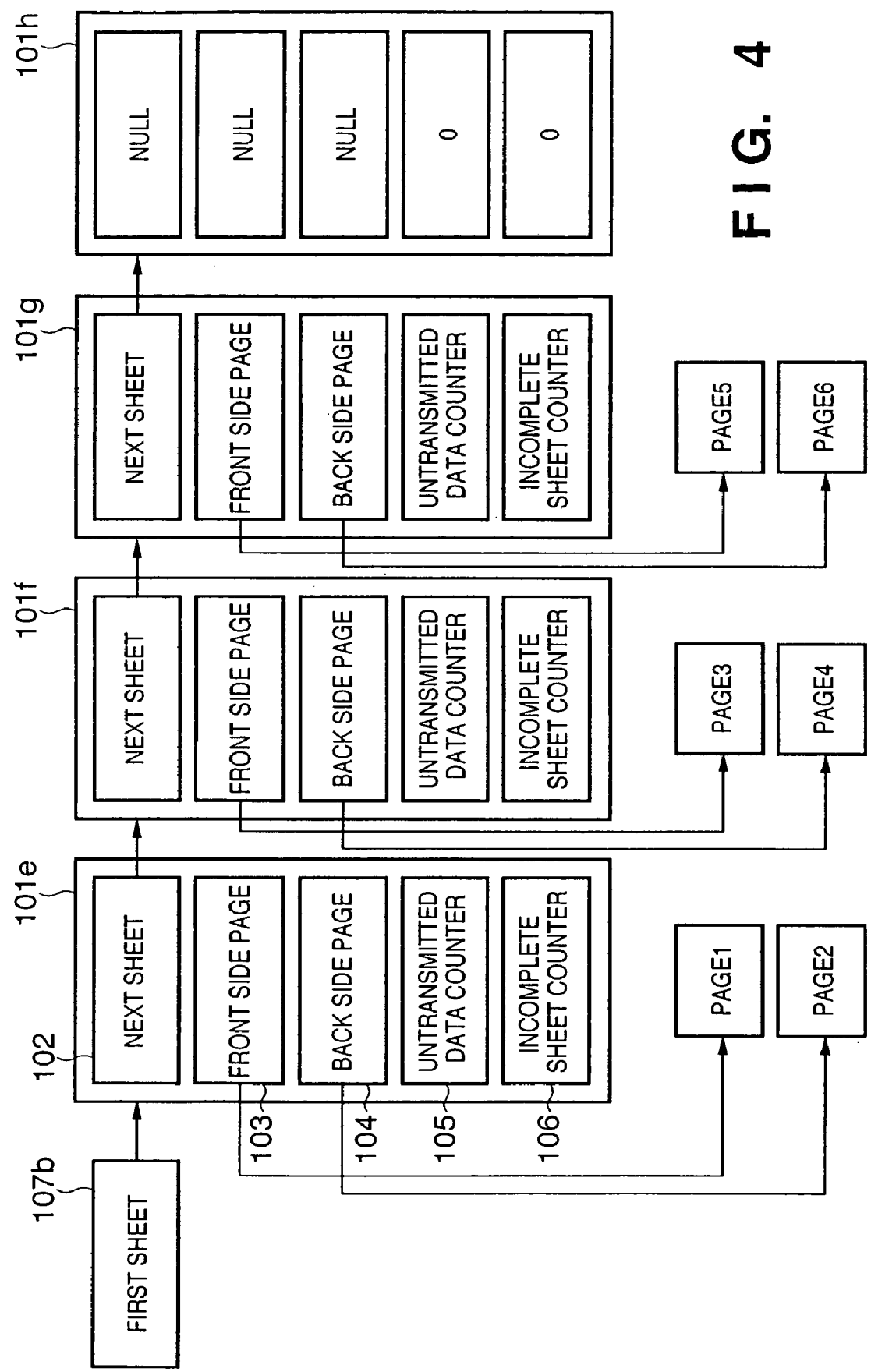
FIG. 4 is a block diagram showing an example of the structure of the sheet management table referred to by the CPU 1501 in processing a job of six pages by double-sided printing.

The CPU 1501 forms a linear list as shown in FIGS. 3 and 4 from a first sheet management table address 107 (107*a* and 107*b*) and the next sheet addresses 102 in an order of receiving the above building components from the operating system 2.

The next sheet address 102=NULL means that no next sheet management table 101 exists. The front side page address 103=NULL means that the sheet is a blank sheet representing the end of a job. The back side page address 104=NULL means that the sheet does not have any back side page and is subjected to single-sided printing.

Figure 10A:
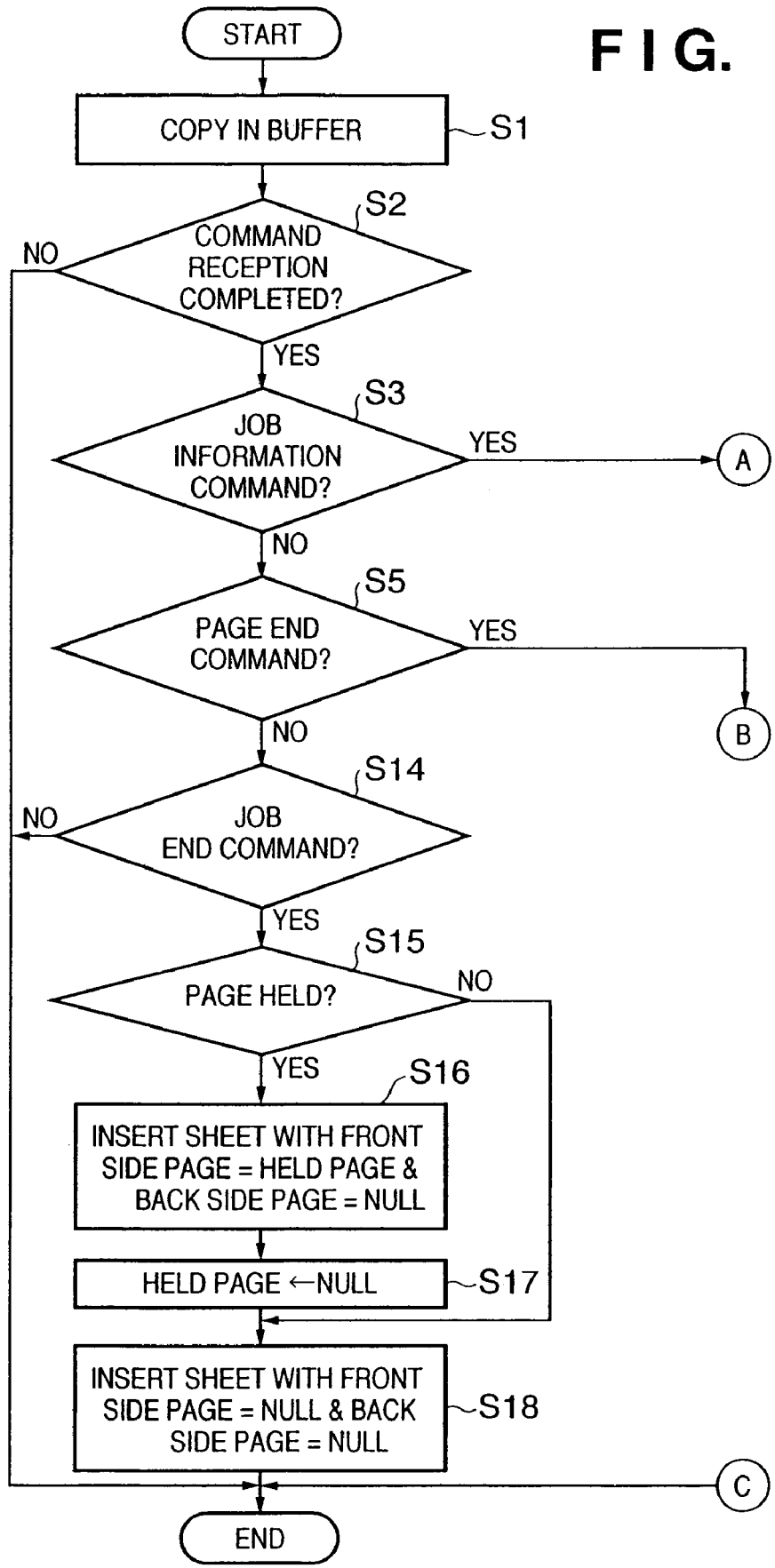
FIG. 10A is a flowchart showing a process of generating a linear list (sheet management tables) as shown in FIGS. 3 and 4 by the CPU 1501 by referring to a print command.
Figure 10B:
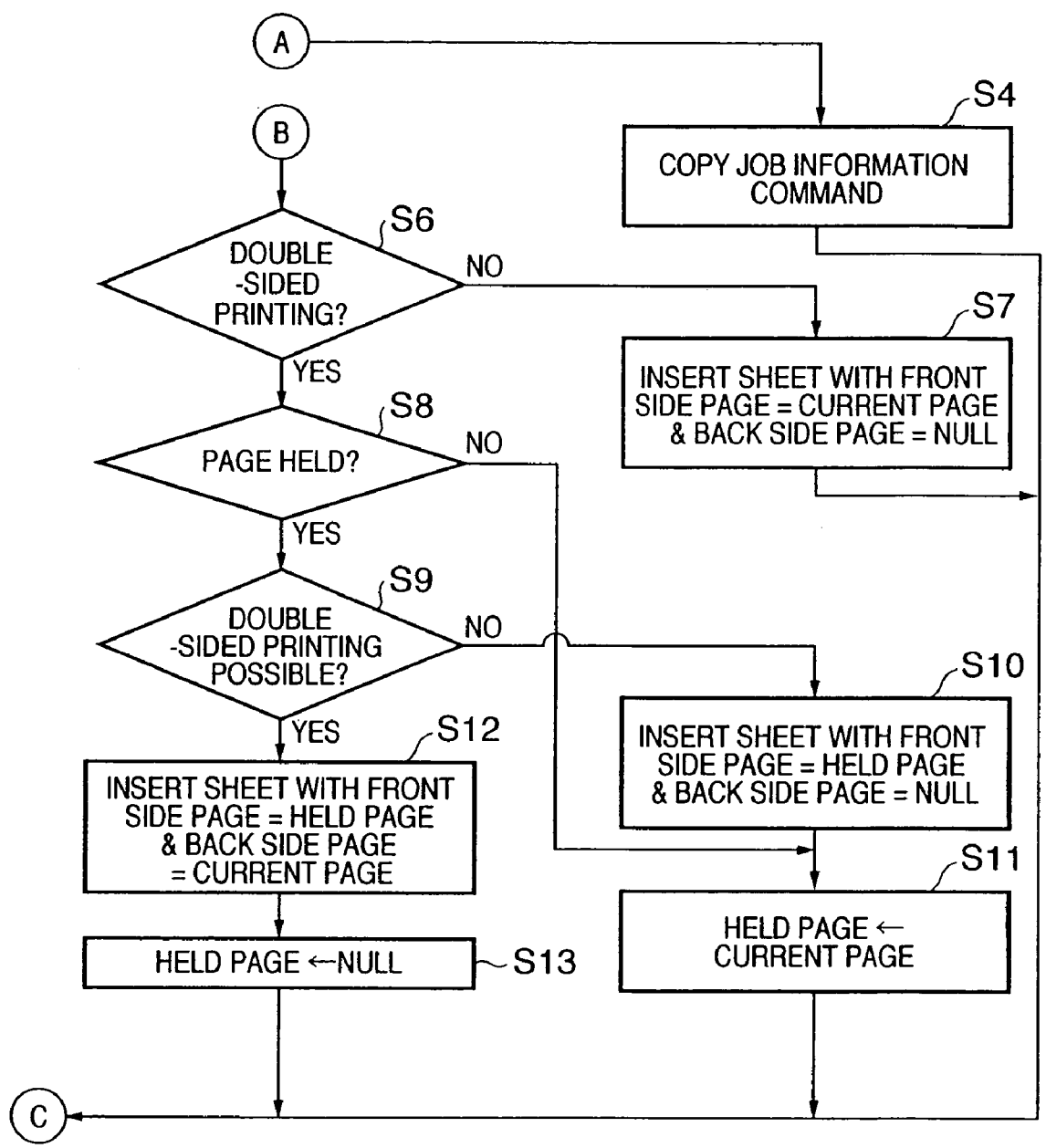
FIG. 10B is a flowchart showing a process of generating a linear list (sheet management tables) as shown in FIGS. 3 and 4 by the CPU 1501 by referring to a print command.

Details of a data reception process by the language monitor 5 will be described with reference to FIGS. 10A and 10B. FIGS. 10A and 10B are a flowchart showing a process of generating a linear list (sheet management tables) as shown in FIGS. 3 and 4 by the CPU 1501 by referring to the print command. A program which causes the CPU 1501 to execute a process complying with the flowcharts of FIGS. 10A and 10B is loaded from the external storage device 1506 to the RAM 1502.

In step S1, a printer command transferred from the operating system 2 is copied in a buffer ensured in the RAM 1502. In step S2, it is determined whether reception of one command has been completed. If the command is interrupted and reception of one command has not been completed, the process ends immediately and waits for the next command reception. If reception of one command has been completed, it is determined in step S3 whether the received command is a job information command. If the received command is the job information command, the received job information command is copied in a work area ensured in the RAM 1502 in step S4, the job information command is deleted from the buffer, and the process ends.

If the command received in step S3 is not the job information command, it is determined in step S5 whether the received command is a page end command. If the received command is the page end command, it is determined in step S6 whether the job information command designates double-sided printing. If the job information command does not designate double-sided printing, the start address of commands for one page in the buffer is set at the front side page address 103 in step S7. If the position of commands in the buffer is known, any information may be set at the front side page address 103.

In step S7, the back side page address 104 is set to NULL. Also in step S7, a print count designated by the job information command is set at the incomplete sheet counter 106. A sheet management table including the front side page address 103, back side page address, and incomplete sheet counter 106 is added to the end of the linear list of sheet management tables 101, and the process ends.

If the job information command designates double-sided printing in step S6, it is determined in step S8 whether a page has been held. The held page means a front side page in double-sided printing that is temporarily held in a predetermined area of the RAM 1502.

If no page has been held, the start address of commands for one page in the buffer is stored as the start address of the held page, and the process ends.

If a page has been held in step S8, it is determined in step S9 whether double-sided printing is possible by a combination of the held page serving as a front side and the current page serving as a back side. More specifically, Double-sided printing is impossible when the paper size designated by the page information command of the front side is not a double-sided printable size, e.g., one of A3, B4, A4, and B5.

Double-sided printing is impossible when the paper type designated by the page information command of the front side is not a double-sided printable type, e.g., plain paper.

Double-sided printing is impossible when the paper size designated by the page information command of the back side does not coincide with that designated by the page information command of the front side.

Double-sided printing is impossible when the paper type designated by the page information command of the back side does not coincide with that designated by the page information command of the front side.

Double-sided printing is impossible when the paper feed source designated by the page information command of the back side does not coincide with that designated by the page information command of the front side.

Double-sided printing is possible except the above cases.

If double-sided printing is determined in step S9 to be possible, the start address of commands for one page in the buffer is set at the back side page address 104, the start address of held pages is set at the front side page address 103, and a print count designated by the job information command is set at the incomplete sheet counter 106 in step S12. Further in step S12, a sheet management table including the front side page address 103, back side page address, and incomplete sheet counter 106 is added to the end of the linear list of sheet management tables 101, and the process ends.

At this time, in order to designate double-sided printing, delivery source designation of the page information command of a back side page represented by the back side page address 104 is changed to the double-sided unit, and paper feed source designation of the page information command of a back side page represented by the front side page address 103 is also changed to the double-sided unit. In step S13, NULL representing that no page has been held is stored at the held page address in the command, and the process ends.

If double-sided printing is determined in step S9 to be impossible, the held page undergoes single-sided printing, and the current page is changed to a held page. For this purpose, in step S10, NULL is set at the back side page address 104, the start address of held pages is set at the front side page address 103, and a print count designated by the job information command is set at the incomplete sheet counter 106 in step S12. Also in step S10, a sheet management table including the front side page address 103, back side page address, and incomplete sheet counter 106 is added to the end of the linear list of sheet management tables 101.

In step S11, the start address of commands for one page in the buffer is stored as the start address of held pages, and the process ends.

If the received command is not the page end command in step S5, it is determined in step S14 whether the received command is a job end command. If the received command is not the job end command, the received command is a page information command or image data, commands for one page have not been received yet, the received command is left in the buffer, and the process ends.

If the received command is the job end command in step S14, it is determined in step S15 whether a page has been held. If no page has been held, the process directly advances to step S18.

If a page has been held, double-sided printing is designated but no corresponding back side page exists, and the same process as that in step S10 is performed in step S16 for single-sided printing. In step S17, NULL representing that no page has been held is stored at the held page address, and the process advances to step S18.

In step S18, in order to represent the end of the job, a sheet management table in which the front side page address 103 and back side page address 104 are set to NULL is added to the end of the linear list of sheet management tables, and the process ends.

To add a sheet management table to the end of the linear list in the above process, the address of a newly added sheet management table must be set at the "next sheet address 102" contained in a sheet management table which is the last table before addition.

Figure 5:
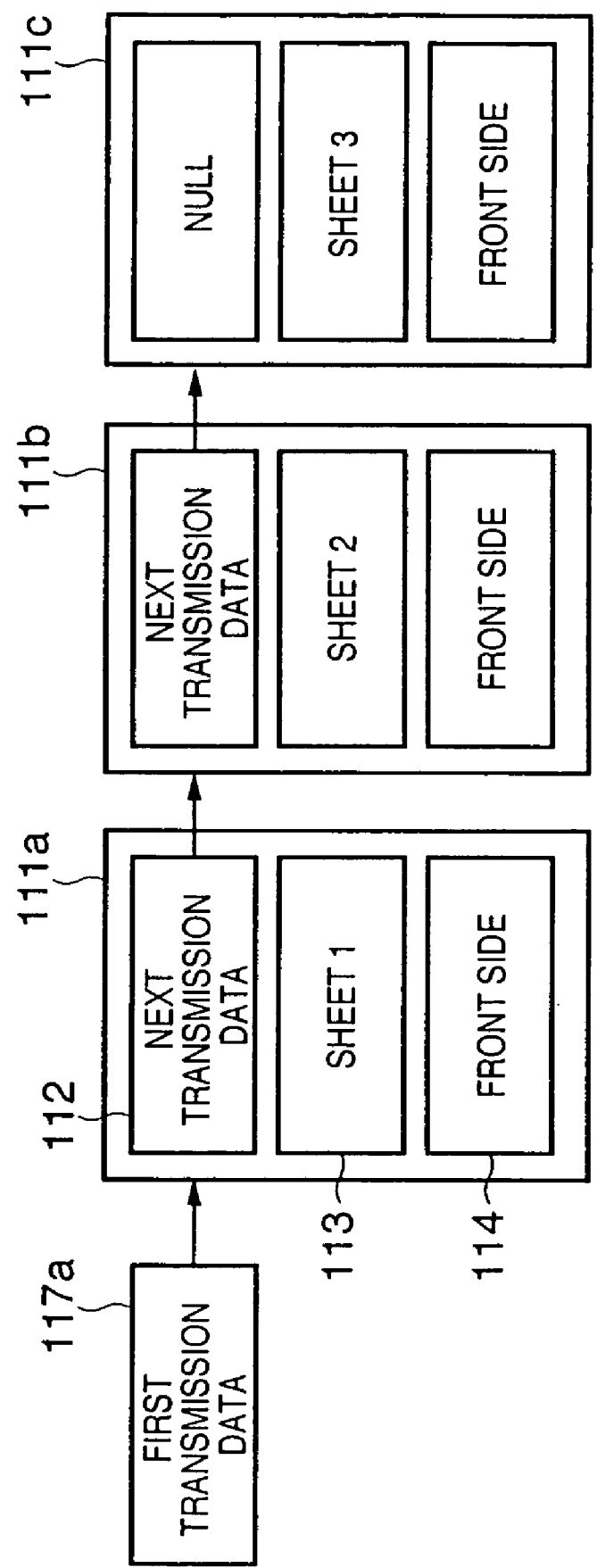
FIG. 5 is a block diagram showing an example of the structure of a transmission data management table 111 referred to in processing a job of three pages by single-sided printing.
Figure 6:
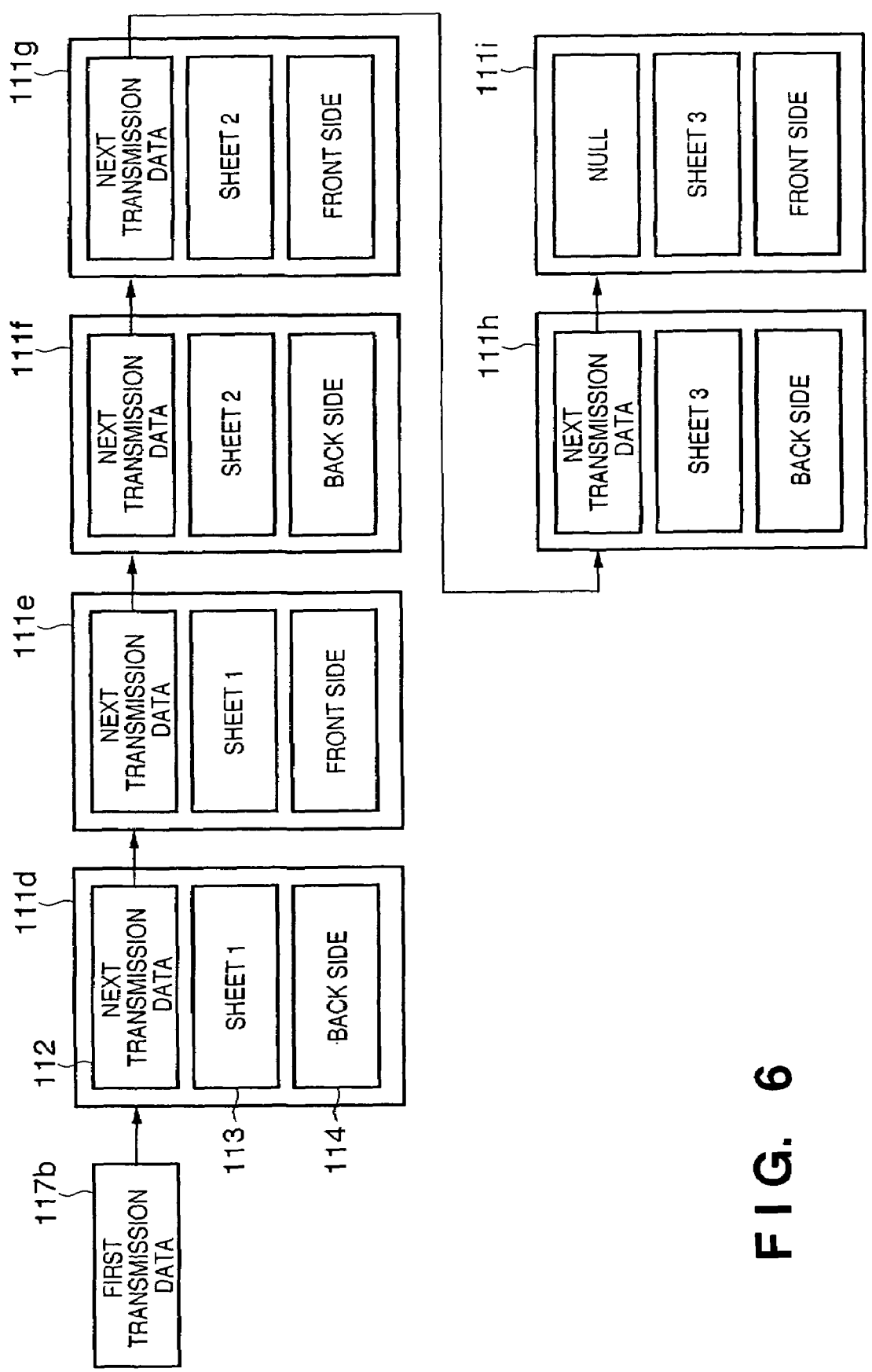
FIG. 6 is a block diagram showing an example of the structure of the transmission data management table 111 referred to in processing a job of six pages by double-sided printing (1-sheet retention)

The data structure of a transmission data management table 111 used by the language monitor 5 will be explained with reference to FIGS. 5 and 6. FIG. 5 is a block diagram showing an example of the structure of the transmission data management table 111 referred to in processing a job of three pages by single-sided printing. FIG. 6 is a block diagram showing an example of the structure of the transmission data management table 111 referred to in processing a job of six pages by double-sided printing (1-sheet retention).

Each transmission data management table 111 (a to i are not particularly suffixed for a description common to all tables 111a to 111i) includes as building components a next transmission data address 112 representing the address of the next transmission data management table 111 in the RAM 1502, a sheet management table address 113 representing the address of a sheet management table 101 corresponding to the transmission data management table 111 in the RAM 1502, a transmission data type 114 representing, as the type of transmission data management table 111, which of a front side page in single- or double-sided printing, a back side page in double-sided printing, and a back side page in double-sided printing of 2-sheet retention is saved in the blank table, and a page number (not shown) representing the print order.

The linear list is formed from a first transmission data management table address 117 (117a and 117b) and the next transmission data addresses 112 in the print order. The next transmission data address 112=NULL means that no next transmission data management table exists. Since printing is done on the back side prior to the front side in face-down delivery, as described above, the back side of a sheet precedes its front side in FIG. 6.

The print order in double-sided printing of 2-sheet retention by alternate paper feed will be explained with reference to FIG. 14. FIG. 14 is a table showing the relationship between the print order and pages in double-sided printing of 2-sheet retention by alternate paper feed.

Double-sided printing requires so-called paper refeed of reversing the leading and trailing ends of a paper sheet and then conveying the paper sheet to a photosensitive drum before the start of printing on the front side after printing on the back side. In double-sided printing of 1-sheet retention, printing cannot be executed during paper refeed, and the print speed decreases. Double-sided printing of 2-sheet retention by alternate paper feed prevents the decrease in print speed by printing on another sheet by utilizing the time during which reversal and paper refeed are executed. More specifically, printing is done in accordance with the following rules.

During back side printing and front side printing on the same sheet, two pages are printed on another sheet.

Back side printing and front side printing are alternately executed.

A page corresponding to transmission order 2 is the front side of a sheet preceding to sheet 1, but this page does not exist, printing cannot be done, and the time becomes idle.

A page corresponding to transmission order 7 is the back side of sheet 4, but this page does not exist, printing cannot be done, and the time becomes idle.

In double-sided printing of 2-sheet retention by alternate paper feed, the upper limit of the sheet length is restricted by the length of a paper convey path or the like, and a paper sheet longer than, e.g., A4 cross feed cannot undergo double-sided printing of 2-sheet retention by alternate paper feed. In this case, double-sided printing is executed by 1-sheet retention.

Double-sided printing of 2-sheet retention by alternate paper feed cannot be done on sheets having different paper sizes or paper types.

Figure 7:
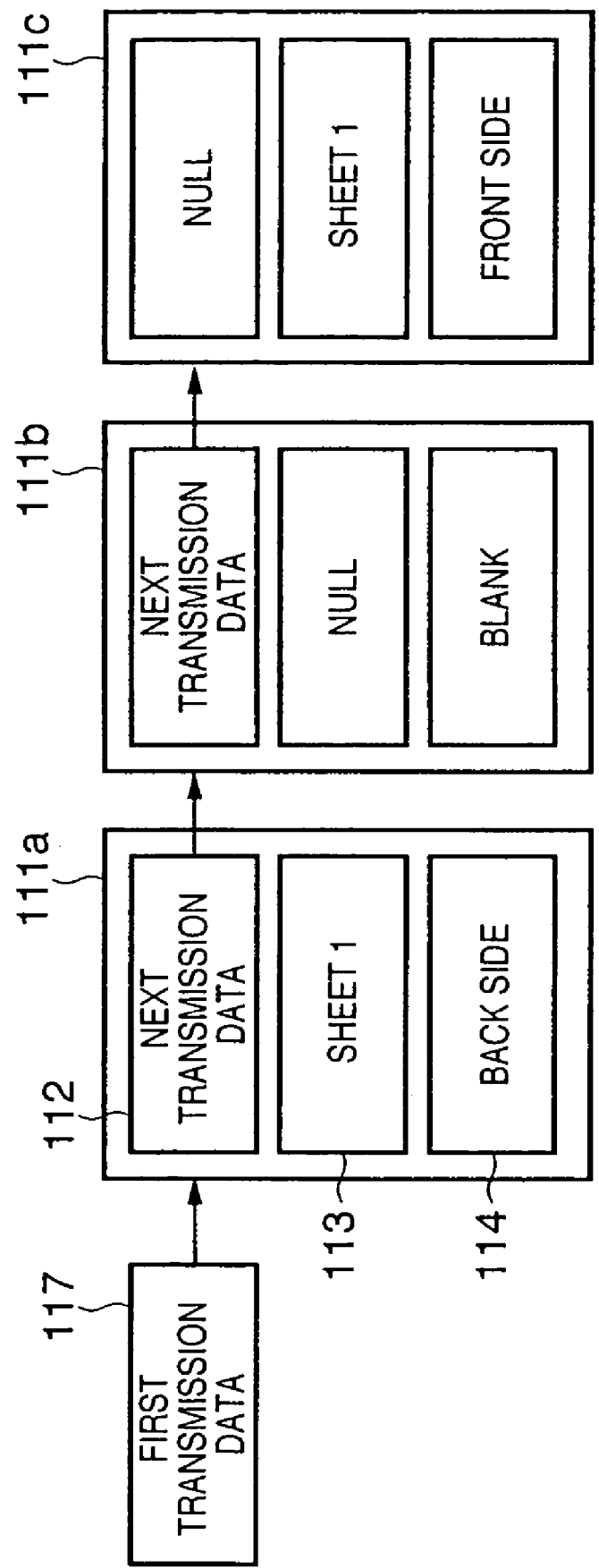
FIG. 7 is a block diagram showing a linear list in a state in which transmission data of two pages are registered.
Figure 8:
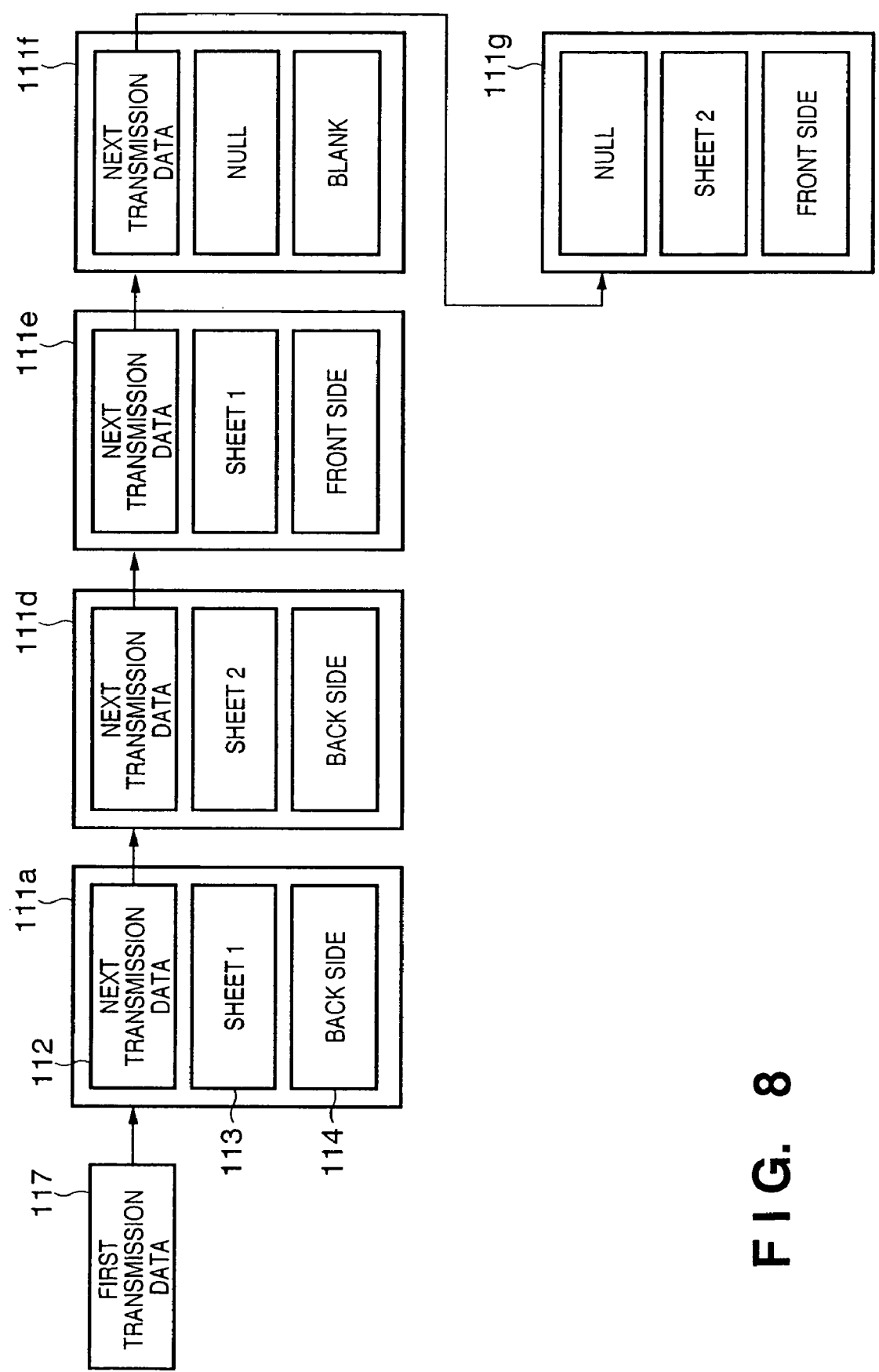
FIG. 8 is a block diagram showing a linear list in a state in which transmission data of four pages are registered.
Figure 9:
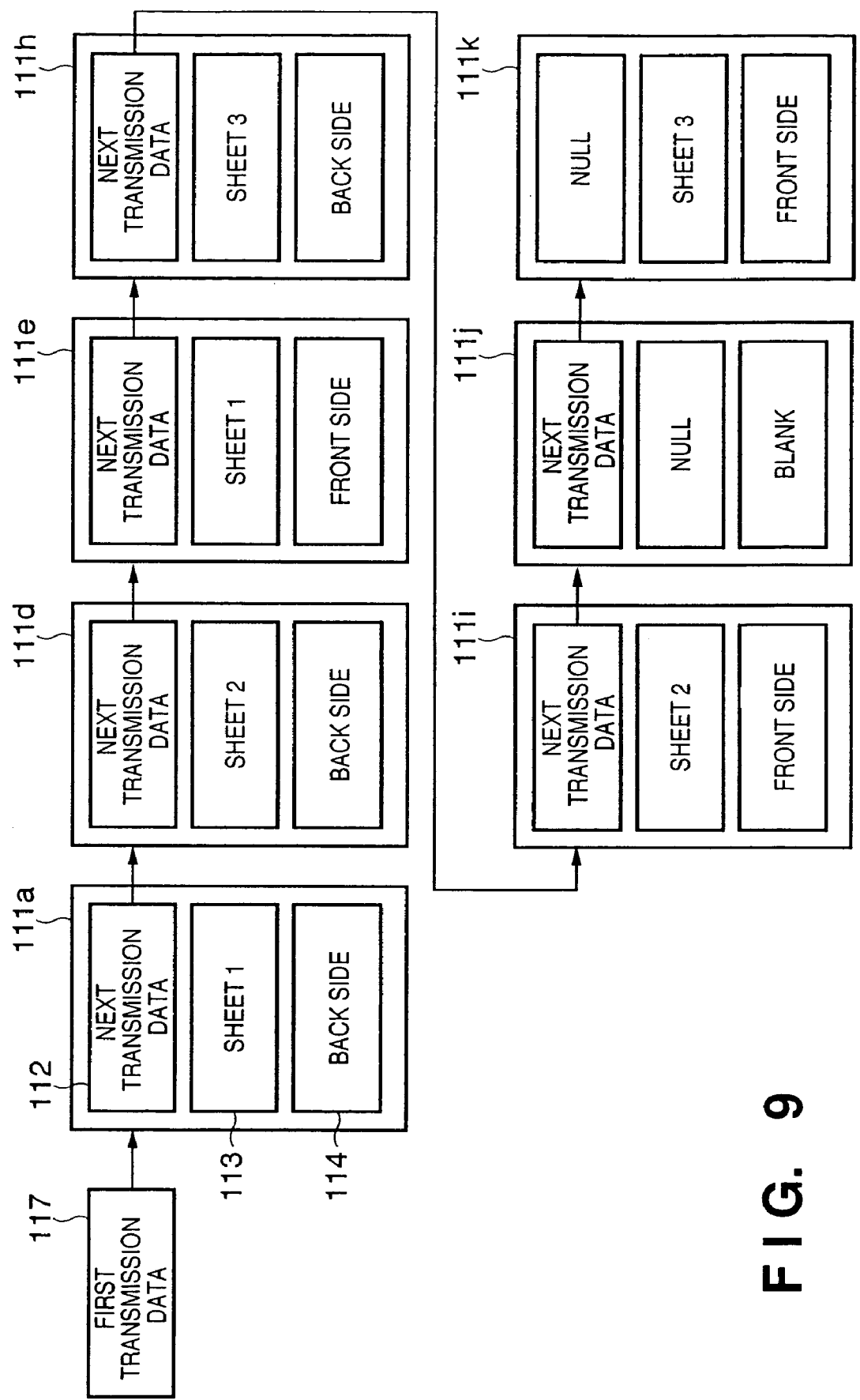
FIG. 9 is a block diagram showing a linear list in a state in which transmission data of six pages are registered.

A method of forming the transmission data management table 111 in double-sided printing of 2-sheet retention by alternate paper feed will be explained with reference to FIGS. 7, 8, and 9. FIG. 7 is a block diagram showing a linear list in a state in which transmission data of two pages are registered. FIG. 8 is a block diagram showing a linear list in a state in which transmission data of four pages are registered. FIG. 9 is a block diagram showing a linear list in a state in which transmission data of six pages are registered.

When the first two pages are registered, the transmission data management tables 111*a* to 111*c* are configured in an order of the back side of sheet 1, blank, and the front side of sheet 1, as shown in FIG. 7. These tables correspond to transmission orders 1, 3, and 4 in FIG. 14.

To further register the next two pages, the linear list (transmission data management tables 111*a* to 111*c*) shown in FIG. 7 is searched, and the searched blank transmission data management table 111*b* is changed to the back side page of sheet 2 (as a result, the transmission data management table 111*b* is changed to a transmission data management table 111*d*). At the same time, a blank transmission data management table 111*f* and a transmission data management table 111*g* for the front side page of sheet 2 are sequentially added to the end of the linear list.

At this time, the address of the transmission data management table 111*f* is set at the "next transmission data address 112" in the transmission data management table 111*c*. Accordingly, the transmission data management table 111*c* is changed to a transmission data management table 111*e*. The address of the transmission data management table 111*g* is set at the "next transmission data address 112" in the transmission data management table 111*f*.

To further register two pages, the linear list (transmission data management tables 111*a* to 111*c*) shown in FIG. 7 is searched, and the searched blank transmission data management table 111*f* is changed to the back side page of sheet 3 (as a result, the transmission data management table 111*f* is changed to a transmission data management table 111*h*). At the same time, a blank transmission data management table 111*j* and a transmission data management table 111*k* for the front side page of sheet 3 are sequentially added to the end of the linear list.

At this time, the address of the transmission data management table 111*j* is set at the "next transmission data address 112" in the transmission data management table 111*g*. Accordingly, the transmission data management table 111*g* is changed to a transmission data management table 111*i*. The address of the transmission data management table 111*k* is set at the "next transmission data address 112" in the transmission data management table 111*j*.

In this manner, necessary pages can be added.

Figure 11A:
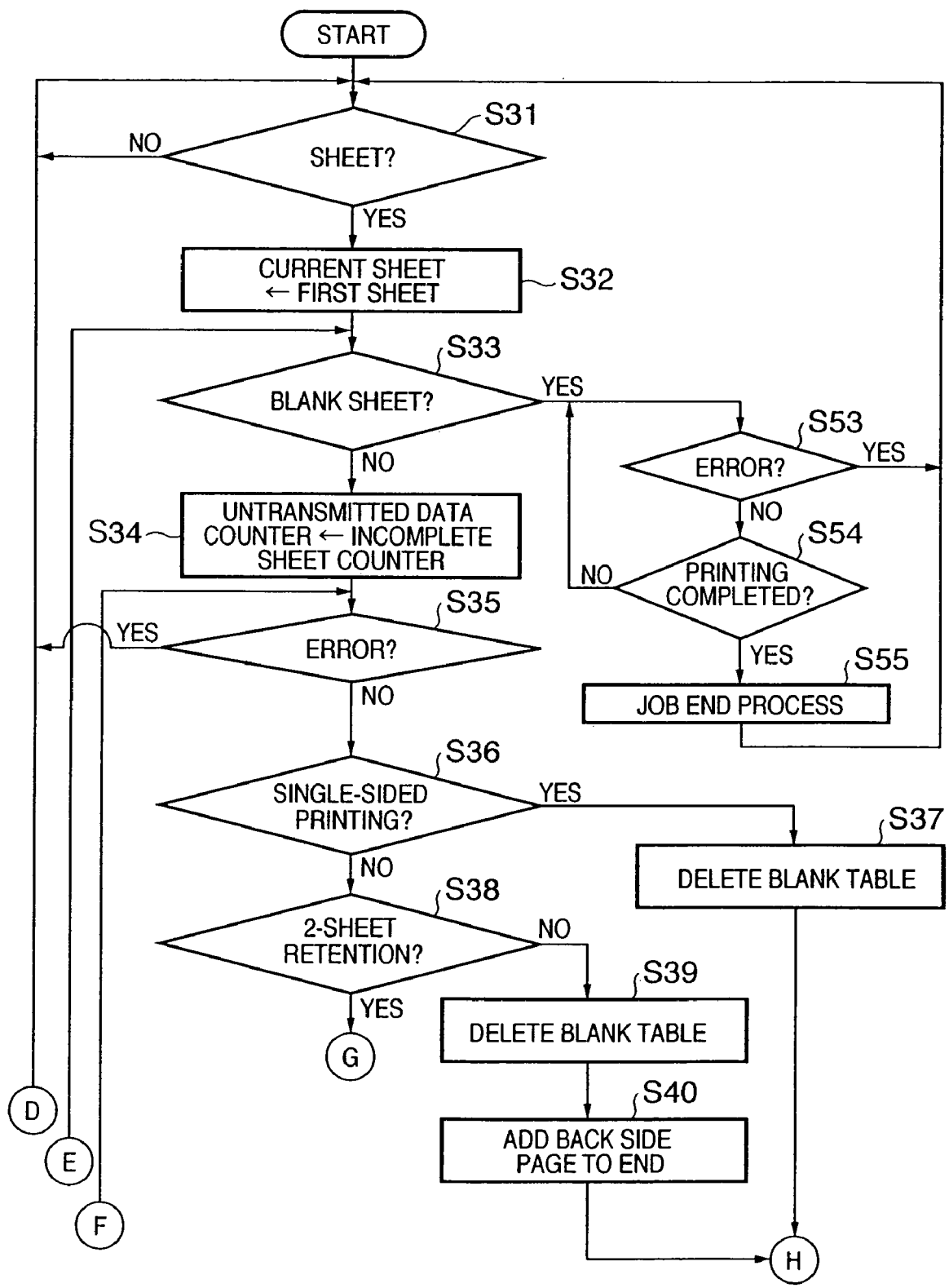
FIG. 11A is a flowchart showing a process of generating a linear list (transmission data management tables) as shown in FIGS. 7, 8, and 9 by the CPU 1501 by referring to the print command.
Figure 11B:
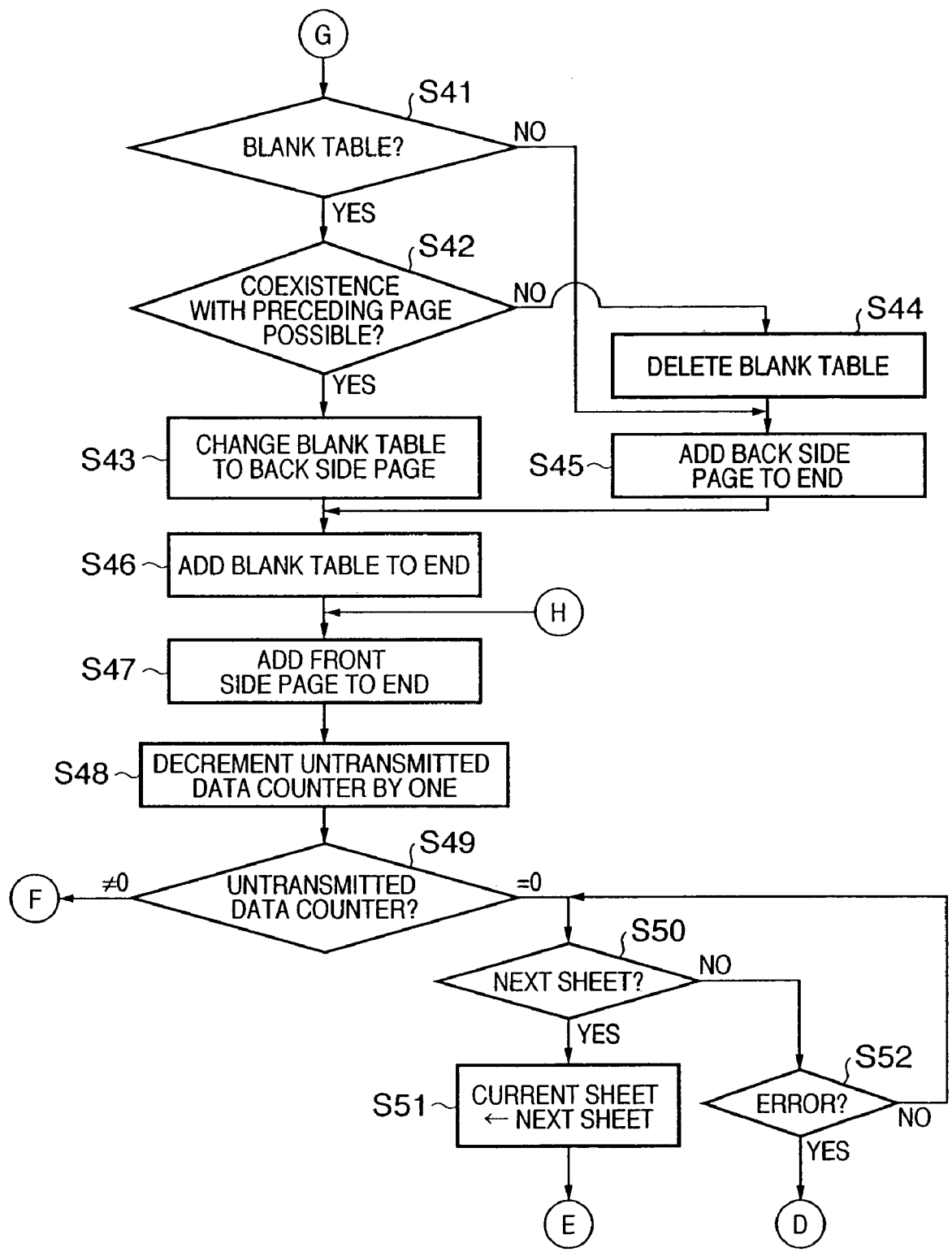
FIG. 11B is a flowchart showing a process of generating a linear list (transmission data management tables) as shown in FIGS. 7, 8, and 9 by the CPU 1501 by referring to the print command.

Details of a transmission data registration process by the language monitor 5 will be described with reference to FIGS. 11A and 11B. FIGS. 11A and 11B are a flowchart showing a process of generating a linear list (transmission data management tables) as shown in FIGS. 7, 8, and 9 by the CPU 1501 by referring to the print command. A program which causes the CPU 1501 to execute a process complying with the flowcharts of FIGS. 11A and 11B is loaded from the external storage device 1506 to the RAM 1502.

The transmission data registration process operates parallel to the data reception process. When the transmission data registration process is activated, it is determined in step S31 whether the sheet management table 101 exists. More specifically, when the first sheet management table address 107 is NULL, no sheet management table 101 exists, and the process returns to step S31.

If the first sheet management table address 107 is not NULL, the sheet management table 101 exists, and the first sheet management table address 107 is set at the current sheet address in step S32.

In step S33, it is determined whether the sheet management table 101 represented by the current sheet address is a blank sheet representing the end of the job. If the front side page address 103 is not NULL, the current sheet is not a blank sheet, and the incomplete sheet counter 106 of the current sheet management table 101 is copied to the untransmitted data counter 105 in step S34.

In step S35, it is determined whether an error has occurred. Information representing whether an error has occurred is acquired by a process sequence (to be described later). If an error has occurred, data must be transmitted again, and the process returns to step S31.

If no error has occurred, it is determined in step S36 whether the current sheet is a sheet subjected to single-sided printing. If the back side page address 104 of the current sheet management table 101 is NULL, the current sheet is a sheet subjected to single-sided printing, and the transmission data management table 111 is searched in step S37. If a blank transmission data management table 111 exists, double-sided printing of 2-sheet retention shifts to single-sided printing, the blank cannot used, and thus the blank table is deleted. After that, the process advances to step S47.

If the back side page address 104 of the current sheet management table 101 is not NULL in step S36, the current sheet is a sheet subjected to double-sided printing, and it is determined in step S38 whether double-sided printing of 2-sheet retention is possible. If the paper size of the current sheet is not, e.g., A4 or B5, double-sided printing of 2-sheet retention is impossible, and the transmission data management table 111 is searched in step S39.

The paper size of the current sheet can be obtained by referring to the page information command.

If a blank transmission data management table 111 exists, double-sided printing of 2-sheet retention shifts to single-sided printing of 1-sheet retention, the blank cannot used, and thus the blank table is deleted.

In step S40, a transmission data management table 111 in which the current sheet address is set at the sheet management table address 113 and the back side page is set at the transmission data type 114 is added to the end of the linear list of transmission data management tables 111, and then the process advances to step S47.

If the paper size of the current sheet is, e.g., A4 or B5 in step S38, double-sided printing of 2-sheet retention is possible, and the transmission data management table 111 is searched in step S41.

If no blank transmission data management table 111 exists, the process advances to step S45. If a blank transmission data management table 111 exists, it is determined in step S42 whether the blank table is available, i.e., double-sided printing of 2-sheet retention can be continued together with the page of the preceding sheet. More specifically, if the paper size and paper type of the page in the last transmission data management table 111 coincide with those of the current sheet, printing can be continued for the pages, and the blank table is available. In step S43, the current sheet address is set at the sheet management table address 113 of the searched transmission data management table 111, the back side page is set at the transmission data type 114, and the process advances to step S46.

If the paper size or paper type of the page in the last transmission data management table 111 does not coincide with that of the current sheet in step S42, no printing can be continued together with the page of the preceding sheet, and the blank table is unavailable. The transmission data management table 111 is searched in step S44, and if a blank transmission data management table 111 exists, the table is deleted, and the process advances to step S45.

In step S45, a transmission data management table 111 in which the current sheet address is set at the sheet management table address 113 and the back side page is set at the transmission data type 114 is added to the end of the linear list of transmission data management tables 111, and then the process advances to step S46.

In step S46, a transmission data management table 111 in which NULL is set at the sheet management table address 113 and a blank table is set at the transmission data type 114 is added to the end of the linear list of transmission data management tables 111, and then the process advances to step S47.

In step S47, a transmission data management table 111 in which the current sheet address is set at the sheet management table address 113 and the front side page is set in the transmission data type 114 is added to the end of the linear list of transmission data management tables 111. In step S48, the untransmitted data counter 105 of the current sheet management table 101 is decremented by one. In step S49, it is determined whether the untransmitted data counter 105 of the current sheet management table 101 is 0.

If the untransmitted data counter 105 of the current sheet management table 101 is not 0, the process returns to step S35 to continue registration of transmission data of the current sheet. If the untransmitted data counter 105 of the current sheet management table 101 is 0, registration of transmission data of the sheet has been executed by a count corresponding to the designated print count, and it is determined in step S50 whether the next sheet management table 101 exists. More specifically, if the next sheet address 102 of the current sheet management table 101 is not NULL, the next sheet management table 101 exists, and the next sheet address 102 of the current sheet management table 101 is stored at the current sheet address in step S51. Then, the process returns to step S33 to start registration of transmission data of the next sheet.

If the next sheet address 102 of the current sheet management table 101 is NULL in step S50, no next sheet management table 101 exists, and it is determined in step S52 whether an error has occurred.

If an error has occurred, the process returns to step S31. If no error has occurred, the process returns to step S50 to repeat processes in steps S50 to S52 until the next sheet management table 101 is added or an error occurs.

If the front side page address 103 is NULL in step S33, the current sheet is a blank sheet representing the end of the job, and it is determined in step S52 whether an error has occurred. If an error has occurred, the process returns to step S31.

If no error has occurred, it is determined in step S54 whether printing is completed. More specifically, if the first sheet management table 107 corresponds to the current sheet address, i.e., the address of the blank sheet representing the end of the job, all the sheet management tables 101 except the blank sheet have been deleted in accordance with a process sequence (to be described later) upon the completion of printing, and a job end process is performed in step S55. In this case, a process of restoring the work area to a state before printing by deleting a blank sheet or the like is executed. Then, the process returns to step S31.

If the first sheet management table 107 does not correspond to the current sheet address in step S54, no printing has been completed. The process returns to step S53 to repeat processes in steps S53 and S54 until printing is completed or an error occurs.

By the above process, the printer 7 can perform the print process by referring to the sheet management table and transmission data management table.

Figure 12:
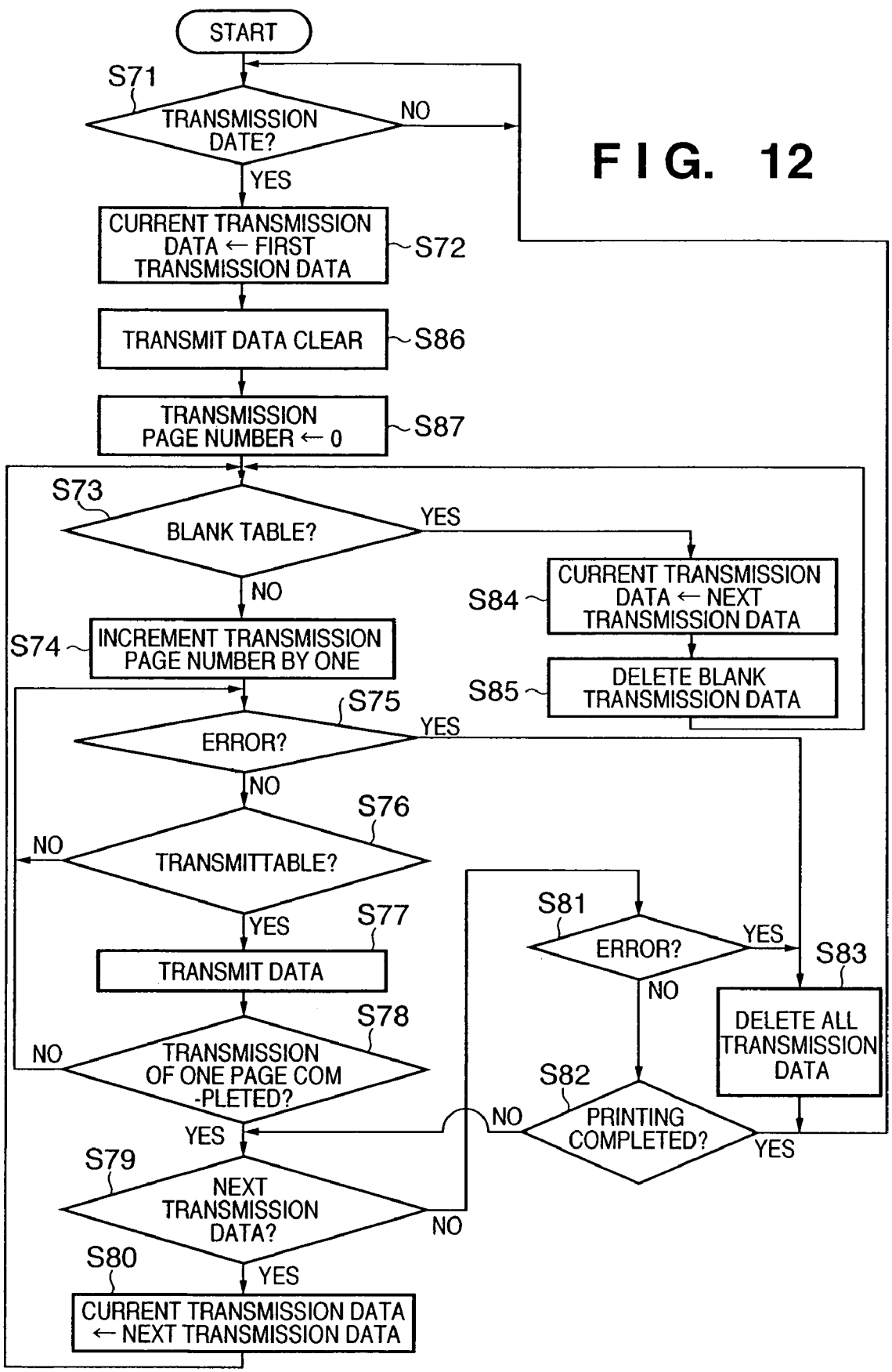
FIG. 12 is a flowchart showing a process of transmitting data to be printed to the printer 7 by the CPU 1501.

Details of a data transmission process by the language monitor 5 will be described with reference to FIG. 12. FIG. 12 is a flowchart showing a process of transmitting data to be printed to the printer 7 by the CPU 1501. A program which causes the CPU 1501 to execute a process complying with the flowchart of FIG. 12 is loaded from the external storage device 1506 to the RAM 1502.

The data transmission process operates parallel to the data reception process and transmission data registration process.

When the data transmission process is activated, it is determined in step S71 whether transmission data exists. More specifically, when the first transmission data management table address 117 is NULL, no transmission data management table 111 exists, and the process returns to step S71.

If the first transmission data management table address 117 is not NULL, the transmission data management table 111 exists, and the first transmission data management table address 117 is stored at the current transmission data management table address in step S72. In step S86, a data clear command is transmitted to the printer 7. Upon reception of the data clear command, the printer 7 discards the received print data, and initializes the internally held page number to 0. In step S87, 0 is stored at the transmission page number.

In step S73, it is determined whether the transmission data type 114 of the current transmission data management table represents a blank table. If the transmission data type 114 of the current transmission data management table is not a blank table, the transmission page number is incremented by one, and the sum is stored at the transmission page number (not shown) of the current transmission data management table in step S74.

In step S75, it is determined whether an error has occurred. If no error has occurred, it is determined in step S76 whether a command can be transmitted. Information representing whether a command can be transmitted is acquired by a process sequence (to be described later). If no command can be transmitted, the process returns to step S75 to repeat processes in steps S75 and S76 until a command becomes transmittable or an error occurs.

If a command can be transmitted in step S76, an untransmitted first command out of commands stored at addresses represented by the front side page addresses 103 or back side page addresses 104 of sheet management tables represented by the sheet management table addresses 113 is transmitted in step S77 to the printer 7 in accordance with whether the transmission data type 114 represents a front or back side page.

In step S78, it is determined whether commands of one page have been transmitted. If commands of one page have not been transmitted, the process returns to step S75 to continue command transmission.

If all commands of one page have been transmitted, it is determined in step S79 whether the next transmission data management table 111 exists. More specifically, if the next transmission data address 112 is not NULL, the next transmission data management table 111 exists. In step S80, the next transmission data address 112 is stored at the current transmission data management data address, and the process returns to step S73.

If the next transmission data address 112 is NULL in step S79, no next transmission data management table 111 exists, and it is determined in step S81 whether an error has occurred. If an error has occurred, data transmission must be executed again, and thus the process returns to step S83 to delete all the transmission data management tables 111, and to step S71.

If no error has occurred, the process advances to step S82 to determine whether printing has been completed. If printing has been completed, the process returns to step S71. If no printing has been completed, the process returns to step S79 to repeat processes in steps S79 to S82 until the next transmission data management table 111 is added, printing is completed, or an error occurs.

If the transmission data type 114 of the current transmission data management table represents a blank table in step S73, transmission data of a transmission data management table subsequent to the current transmission data management table is to be transmitted, and the blank table becomes unavailable. Thus, the next transmission data address 112 is stored at the current transmission data management table address in step S84, the current transmission data management table 111, i.e., blank table is deleted in step S85, and the process returns to step S73.

Figure 13:
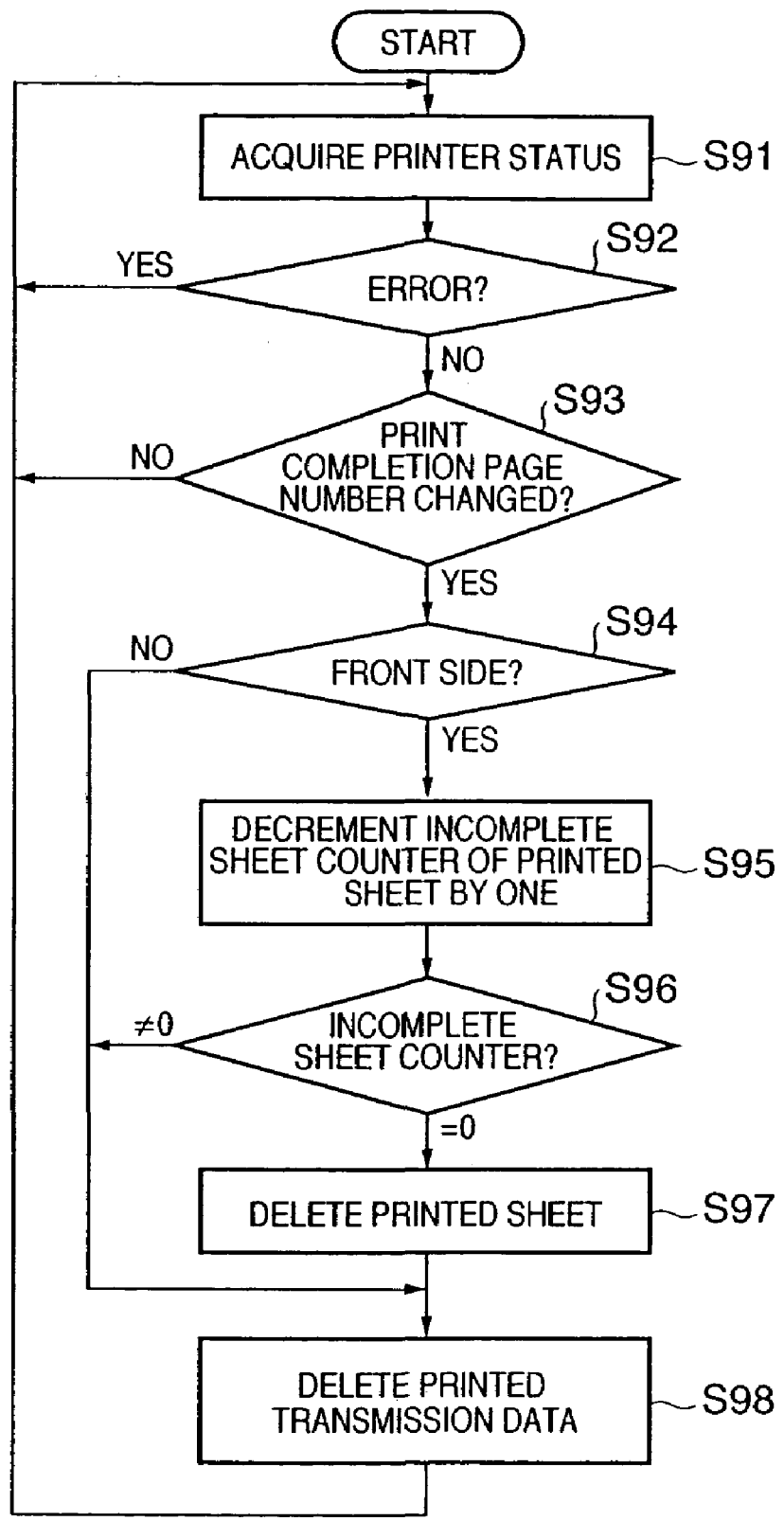
FIG. 13 is a flowchart showing a process of monitoring a status by the CPU 1501 by a communication process with the printer 7.

Details of a status monitoring process by the language monitor 5 will be described with reference to FIG. 13. FIG. 13 is a flowchart showing a process of monitoring a status by the CPU 1501 by a communication process with the printer 7. A program which causes the CPU 1501 to execute a process complying with the flowchart of FIG. 13 is loaded from the external storage device 1506 to the RAM 1502.

The status monitoring process operates parallel to the data reception process, transmission data registration process, and data transmission process.

When the status monitoring process is activated, a printer status is acquired in step S91. More specifically, a status request command is transmitted to the printer 7, and a printer status sent back from the printer 7 in response to the command is received. The printer status contains at least the following pieces of information.

Whether the printer 7 is in an error state?
Whether a page information command can be received?
Whether an image data command can be received?
Page number of a printed page In step S92, it is determined whether an error has occurred. If an error has occurred, the process returns to step S91. If no error has occurred, it is determined in step S93 whether the print completion page number has changed from the previously acquired value. If no print completion page number has changed from the previously acquired value, the process returns to step S91.

If the print completion page number has changed from the previously acquired value, it is determined in step S94 whether the printed page corresponds to a front side. More specifically, if the transmission data type 114 of the transmission data management table 111 having undergone printing does not represent a front side page, the printed page does not correspond to a front side, and the process advances to step S98.

If the transmission data type 114 of the transmission data management table 111 having undergone printing represents a front side page, the incomplete sheet counter 106 of the sheet management table 101 represented by the sheet management table 113 of the transmission data management table 111 having undergone printing is decremented by one in step S95.

In step S96, it is determined whether the incomplete sheet counter 106 represents 0. If the incomplete sheet counter 106 does not represent 0, the process advances to step S98. If the incomplete sheet counter 106 represents 0, printing has been completed by the designated count, and the sheet management table 101 represented by the sheet management table 113 of the transmission data management table 111 having undergone printing is deleted in step S97. At this time, if a data buffer represented by the front side page address 103 and the back side page address 104 are not NULL, a data buffer represented by the back side page address 104 is freed. After that, the process advances to step S98.

In step S98, the transmission data management table 111 having undergone printing is deleted, and the process returns to step S91.

Since the above process transmits pages in the print order in double-sided printing, double-sided printing can be done with a memory of the same capacity as that for single-sided printing without any additional memory for double-sided printing.

Second Embodiment

In the first embodiment, the delivery destination is always a face-down tray, and printing is always done on the back side prior to the front side. Instead of this, when face-up delivery is designated by the operator or as the delivery destination of the printer 7 by designation from a lever or panel, printing may be done on the front side prior to the back side.

In the first embodiment, double-sided printing is performed by 1-sheet retention or 2-sheet retention of alternate paper feed. Instead of this, double-sided printing may be done by an arbitrary method such as 2-sheet retention of non-alternate paper feed (order of 2, 1, 4, 3, . . . ) or 3-sheet retention of alternate paper feed (order of 2, 4, 6, 1, 8, 3, 10, 5 . . . )

Other Embodiment

The object of the present invention is also achieved when a recording medium (or storage medium) which records software program codes for realizing the functions of the above-described embodiments is supplied to a system or apparatus, and the computer (or the CPU or MPU) of the system or apparatus reads out and executes the program codes stored in the recording medium. In this case, the program codes read out from the recording medium realize the functions of the above-described embodiments, and the recording medium which records the program codes constitutes the present invention.

The functions of the above-described embodiments are realized when the computer executes the readout program codes. Also, the present invention includes a case in which an OS (Operating System) or the like running on the computer performs some or all of actual processes on the basis of the instructions of the program codes and thereby realizes the functions of the above-described embodiments.

Furthermore, the present invention includes a case in which, after the program codes read out from the recording medium are written in the memory of a function expansion card inserted into the computer or the memory of a function expansion unit connected to the computer, the CPU of the function expansion card or function expansion unit performs some or all of actual processes on the basis of the instructions of the program codes and thereby realizes the functions of the above-described embodiments.

When the present invention is applied to the recording medium, the recording medium stores program codes corresponding to the above-described flowcharts (functional arrangements).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-149390 filed on May 19, 2004, which is hereby incorporated by reference herein.

What is claimed is:

1. A computer which comprises:
a generating unit which generates transmission data to be output to a printing apparatus configured to perform double-sided printing;
an adding unit which, when a transmission data management table does not contain any blank table, adds a back side page to an end, adds a blank table to the end, and adds a front side page to the end, and, when the transmission data management table contains a blank table, changes the blank table to a back side page, adds a blank table to the end, and adds a front side page to the end; and
a determination unit which determines whether or not double-sided printing is possible in 2-sheet retention,
wherein, when said determination unit determines that double-sided printing is impossible in 2-sheet retention, said adding unit adds a back side page to the end and adds a front side page to the end,
wherein, when said determination unit determines that double-sided printing is possible in 2-sheet retention and the transmission data management table does not contain any blank table, said adding unit adds to the end a back side page, a blank table and a front side page, and
when said determination unit determines that double-sided printing is possible in 2-sheet retention and the transmission data management table contains a blank table, said adding unit changes the blank table to a back side page and adds to the end a blank table and a front side page.

2. The computer according to claim 1, further comprising a generation unit which generates a sheet management table, which includes an address of a front side page and an address of a back side page for each sheet, wherein said adding unit operates parallel to said generation unit.

3. A printing method in a computer which generates transmission data to be output to a printing apparatus configured to perform double-sided printing, comprising:
performing by a processor the following steps:
when a transmission data management table does not contain any blank table, adding a back side page to an end, adding a blank table to the end, and adding a front side page to the end, and when the transmission data management table contains a blank table, changing the blank table to a back side page, adding a blank table to the end, and adding a front side page to the end; and
determining whether or not double-sided printing is possible in 2-sheet retention,
wherein, when said determining step determines that double-sided printing is impossible in 2-sheet retention, said adding step adds a back side page to the end and a front side page to the end,
wherein, when said determining step determines that double-sided printing is possible in 2-sheet retention and the transmission data management table does not contain any blank table, said adding step adds to the end a back side page to the end, a blank table and a front side page, and
when it is determined in said determining step that double-sided printing is possible in 2-sheet retention and the transmission data management table contains a blank table.

4. The printing method according to claim 3, further comprising a generating step which generates a sheet management table which includes an address of a front side page and an address of a back side page for each sheet, wherein said adding step operates in parallel to said generating step.

5. A computer-readable storage medium storing a program executed by a computer which generates transmission data to be output to a printing apparatus configured to perform double-sided printing, comprising the steps:
when a transmission data management table does not contain any blank table, adding a back side page to an end, adding a blank table to the end, and adding a front side page to the end, and when the transmission data management table contains a blank table, changing the blank table to a back side page, adding a blank table to the end, and adding a front side page to the end; and
determining whether or not double-sided printing is possible in 2-sheet retention,
wherein, when said determining step determines that double-sided printing is impossible in 2-sheet retention, said adding step adds a back side page to the end and a front side page to the end,
wherein, when said determining step determines that double-sided printing is possible in 2-sheet retention and the transmission data management table does not contain any blank table, said adding step adds to the end a back side page to the end, a blank table and a front side page, and
when it is determined in said determining step that double-sided printing is possible in 2-sheet retention and the transmission data management table contains a blank table, said adding step changes the blank table to a back side page, adds a blank table to the end and adds a front side page to the end.

6. The computer-readable storage medium of claim 5, wherein the program further comprises s generating step which generates a sheet management table which includes an address of a front side page and an address of a back side page for each sheet, and wherein said adding step operates in parallel with said generating step.

* * * * *